US011319910B2

(12) United States Patent
Nichols

(10) Patent No.: US 11,319,910 B2
(45) Date of Patent: May 3, 2022

(54) FUEL INJECTOR INTERFACE DEVICE AND METHOD OF USE

(71) Applicant: Randal S. Nichols, Winter Garden, FL (US)

(72) Inventor: Randal S. Nichols, Winter Garden, FL (US)

(*) Notice: Subject to any disclaimer, the term of this patent is extended or adjusted under 35 U.S.C. 154(b) by 37 days.

(21) Appl. No.: 16/813,187

(22) Filed: Mar. 9, 2020

(65) Prior Publication Data

US 2021/0277855 A1 Sep. 9, 2021

(51) Int. Cl.
*F02M 51/00* (2006.01)
*F02M 57/00* (2006.01)

(52) U.S. Cl.
CPC ........ *F02M 51/005* (2013.01); *F02M 57/005* (2013.01); *F02M 2200/247* (2013.01)

(58) Field of Classification Search
CPC ...... F02M 51/00; F02M 51/005; F02M 57/00; F02M 57/005; F02M 2200/247
USPC .......... 701/102–105; 123/472–481, 490, 498
See application file for complete search history.

(56) References Cited

U.S. PATENT DOCUMENTS

| 5,241,933 A * | 9/1993 | Morikawa ........... F02D 41/3863 123/198 D |
| 5,783,990 A * | 7/1998 | Dambach ................ F01N 9/007 340/438 |
| 6,474,292 B1 * | 11/2002 | Frenz ..................... F02D 41/22 123/198 D |
| 2010/0014553 A1 * | 1/2010 | Pryor ..................... G01N 25/02 374/16 |
| 2016/0177855 A1 * | 6/2016 | Kusakabe ............... F02D 41/20 123/490 |
| 2016/0237937 A1 * | 8/2016 | Kusakabe ............. F02D 41/402 |
| 2018/0010565 A1 * | 1/2018 | Furukawa ............ F02M 65/001 |

* cited by examiner

*Primary Examiner* — John Kwon
*Assistant Examiner* — Johnny H Hoang
(74) *Attorney, Agent, or Firm* — Jason T. Daniel, Esq.; Daniel Law Offices, P.A.

(57) ABSTRACT

A fuel injector interface device and associated method include an interface device having a plurality of input leads and a plurality of output leads. The input leads are communicatively linked to the fuel pressure sensor on the common rail of a vehicle fuel injection system. The output leads are communicatively linked to a display device such as a diagnostic scope. Circuitry positioned within the interface device detects the rail pressure signals, filters the signals, and outputs data to the display device representing a graphical depiction of the same. A method of using the interface device includes generating the signals, mapping the signals to an individual fuel injector of the vehicle's engine cylinder and determining fluctuations in the strength of the displayed signals to determine anomalies in a particular fuel injector.

15 Claims, 5 Drawing Sheets

FUEL INJECTOR INTERFACE DEVICE AND METHOD OF USE

TECHNICAL FIELD

The present invention relates generally to automotive diagnostic tools, and more particularly to an interface device for detecting anomalies in fuel injectors.

BACKGROUND

The statements in this section merely provide background information related to the present disclosure and may not constitute prior art.

Since 2008, most automobile manufacturers have switched from standard multi-port fuel injection systems to gasoline direct injection systems which are much more fuel efficient, produce higher power, and have lower emission rates. However, this change has resulted in a higher instance of fuel system problems than the previous system.

Although some manufacturers have designed their systems with functionality for troubleshooting individual cylinders and injectors, many have not. As a result, when fuel-related problems arise, the standard technical protocol is to remove all injectors from the engine and have them sent to a facility for individual bench testing and/or cleaning to determine which injector is malfunctioning.

Such a process is extremely expensive and time consuming for the vehicle owner who must be without their vehicle for several days in such situations.

Accordingly, it would be beneficial to provide a device that can interface with all fuel injectors of an automobile to allow a technician to quickly and easily test the functionality of the same without the drawbacks described above.

SUMMARY OF THE INVENTION

The present invention is directed to a fuel injector interface device and associated method of using the same.

One embodiment of the present invention can include an interface device having a plurality of input leads and a plurality of output leads. The input leads can be communicatively linked to a vehicle fuel injection system, and preferably to the fuel pressure sensor along the common rail. The output leads can be communicatively linked with a display device such as a diagnostic scope, for example.

Circuitry positioned within the interface device can detect the rail pressure signals and output data to the display device representing a graphical depiction of the same. Each of these signals can be mapped to an individual fuel injector of an engine cylinder and fluctuations in the strength of the displayed signals can represent anomalies in a particular fuel injector.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
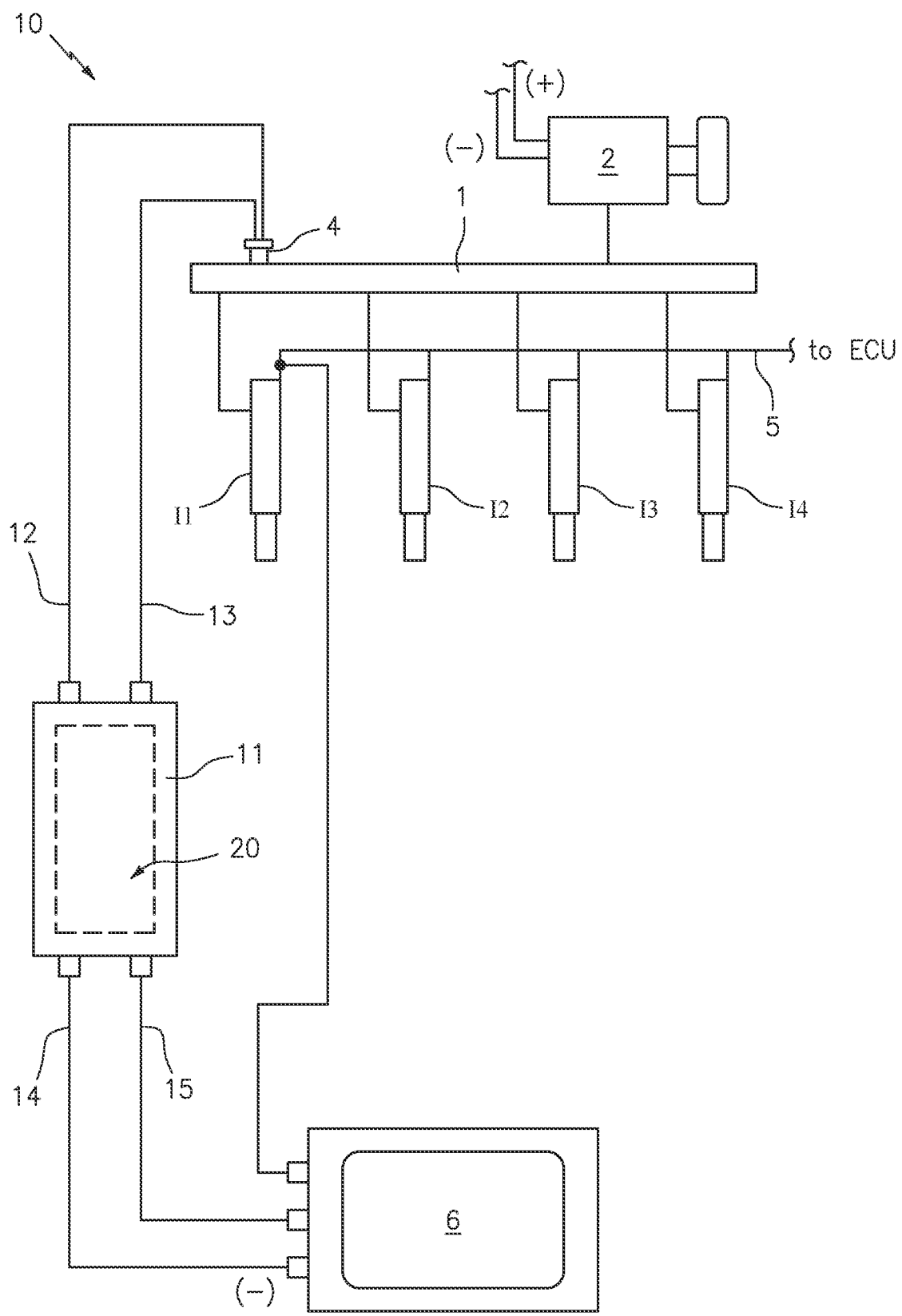
FIG. 1 is perspective view of an exemplary fuel injector interface device in operation, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the invention.

Definitions

As described herein, a "unit" means a series of identified physical components and/or functionally equivalent components which are linked together and/or function together to perform a specified function.

As described herein, the term "removably secured," and derivatives thereof shall be used to describe a situation wherein two or more objects are joined together in a non-permanent manner so as to allow the same objects to be repeatedly joined and separated.

FIGS. 1-5 illustrate one embodiment of a fuel injector interface device 10 and corresponding method that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Although described herein as a device for detecting anomalies within a fuel injection system, the inventive concepts are not so limiting. To this end, those of skill in the art will recognize that the functionality of the inventive device may be used for many other purposes where it is useful to sense voltages and/or "zoom in" on virtually any automotive signal. In this regard, the inventive device can function to reject non-automotive frequency signals by filtering out signals less than 2 HZ and filtering signals greater than about 900 HZ and by amplifying the leftover.

Accordingly, the application is not to be construed as limiting to any particular use or purpose.

In direct injection gasoline systems, a common fuel rail 1 is positioned between a fuel pump 2 and a plurality of fuel injectors I1, I2, I3 and I4—in the case of a four-cylinder engine. A fuel pressure sensor 4 is positioned along the fuel rail and is communicatively linked to the vehicle's onboard computer. The fuel pressure sensor is powered by the onboard vehicle battery and is thus a DC circuit. Each of the injectors I1-I4 are also communicatively linked 5 with an onboard controller. Although not illustrated, six-cylinder and eight-cylinder engines will have six and eight fuel injectors, respectively, and the functionality described herein will be the same.

As will be described below, the inventive fuel injector interface device 10 includes functionality for detecting and monitoring fluctuations in the common rail 1, as detected by the pressure sensor 4 during engine operation. The system also includes functionality for outputting a graphical illustration of the filtered rail pressure signal on a display unit 6 such as a mechanic's diagnostic scope, for example, so as to allow a technician to visually detect anomalies in the performance of an individual fuel injector I1-I4.

As shown at FIG. 1, the interface device 10 can include a main body 11, input leads 12 and 13, output leads 14 and 15, and an internal controller/circuitry 20. The main body 11 can include any number of different shapes and sizes and can be constructed from any number of different materials suitable for encompassing each of the internal elements. In one preferred embodiment, the main body 11 can be constructed from lightweight injection molded plastic having a plurality of internal connectors (not shown) for securely housing and positioning each of the device elements. Of course, any number of other known construction materials such as PVC, metals and composites, for example, are also contemplated. Each of the leads 12-15 can include any type of materials suitable for transmitting electronic signals. Each of the leads can also include connectors/adaptors along the ends so as to mate with or connect to a secondary device. These connectors can include, for example, various shaft-type plug connectors (e.g., banana plug), and/or compression fittings such as alligator clips, for example.

Figure 2:
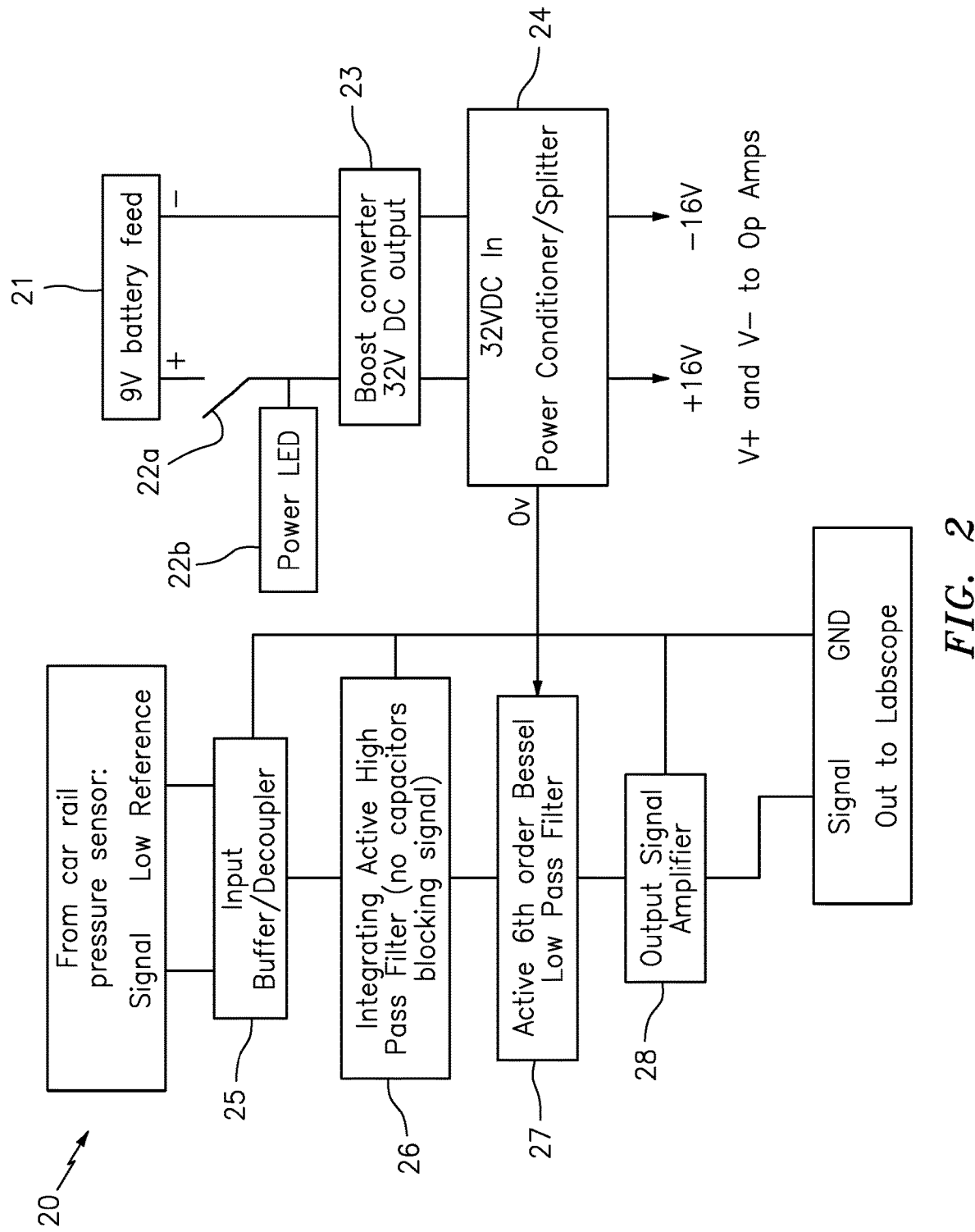
FIG. 2 is a simplified block diagram of the internal components of the exemplary fuel injector interface device, in accordance with one embodiment of the invention.

As shown in the block diagram of FIG. 2, the internal circuitry 20 of the device 10 can include one or more components such as the illustrated power source 21, switch 22a, light 22b, boost converter 23, power conditioner 24, an input buffer/decoupler 25, a high pass filter 26, a low pass filter 27, and an output signal amplifier 28.

Although illustrated as separate elements, those of skill in the art will recognize that one or more system components may comprise or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

The power source 21 can include any number and type of devices capable of providing the base power requirements to the internal circuitry. In the preferred embodiment, the power source can include a 9-volt battery, for example, however other types and voltages are also contemplated.

The switch 22a can be connected to the power source and can function to allow a user to power the device between an ON and OFF operating state. Likewise, an optional LED light 22b can provide a visual indication that the device 10 is in the ON position.

The boost converter 23 can be communicatively linked to the power source and can function to increase the voltage supplied therefrom. In the preferred embodiment, the boost converter can include, comprise or consist of circuitry capable of boosting 9 volts supplied by the power source to an output of 32 volts; however, any number of other devices and voltages are also contemplated.

The power conditioner 24 can be communicatively linked to the boost converter and can function to establish a floating ground/reference low for the Op Amps to work from.

The input buffer and decoupler 25 can be communicatively linked to the input leads 12 and 13, which are in turn connected to the low reference/ground pin and the positive pin at the vehicle pressure sensor 4, respectively. The decoupler 25 can pass the received low reference signal from lead 12 to the ground output lead 14 and can pass the received pressure sensor signal from lead 13 to the high pass filter 26.

The integrating active high pass filter 26 can be communicatively linked to the output of the decoupler 25 and can function to cancel the DC offset from the received pressure sensor signal and to establish a high pass frequency cutoff. Rather than using a standard resistor/capacitor setup which places a capacitor directly in the input signal path, thus causing distortion issues, the high pass filter described herein directly receives the input signal, thus giving a better reproduction of the signal while still canceling out the dc offset.

The low pass filter 27 can be communicatively linked to both the active high pass filter 26 and the power conditioner 24 and can function to remove any high frequency noise from the received signals. In the preferred embodiment, the filter will preferably comprise a $6^{th}$ order low pass filter which provides a 36 db per octave attenuation, thus reducing the signal noise rapidly as frequencies exceed the cutoff frequency, and allowing for significantly less distortion in the input signal.

The output signal amplifier 28 can amplify the received signals from the low pass filter 27 and send the amplified signal to the output lead 15.

Output leads 14 and 15 can be connected to various types of known display devices 6 that are capable of receiving electrical signals and displaying the same in a visual manner such as a graph, for example. In the preferred embodiment, the display 6 can include, comprise or consist of an automotive mechanic diagnostic tablet, such as the Verus Edge Automotive Diagnostic and Information Tool having an onboard scope module that is commercially available from SNAP-ON, for example. Of course, any number of other types of display devices are also contemplated. Moreover, other embodiments are contemplated wherein the device 10 can include a dedicated display and input (e.g., push buttons, etc.) and/or can be incorporated into the design of a new diagnostic tablet.

Figure 3:
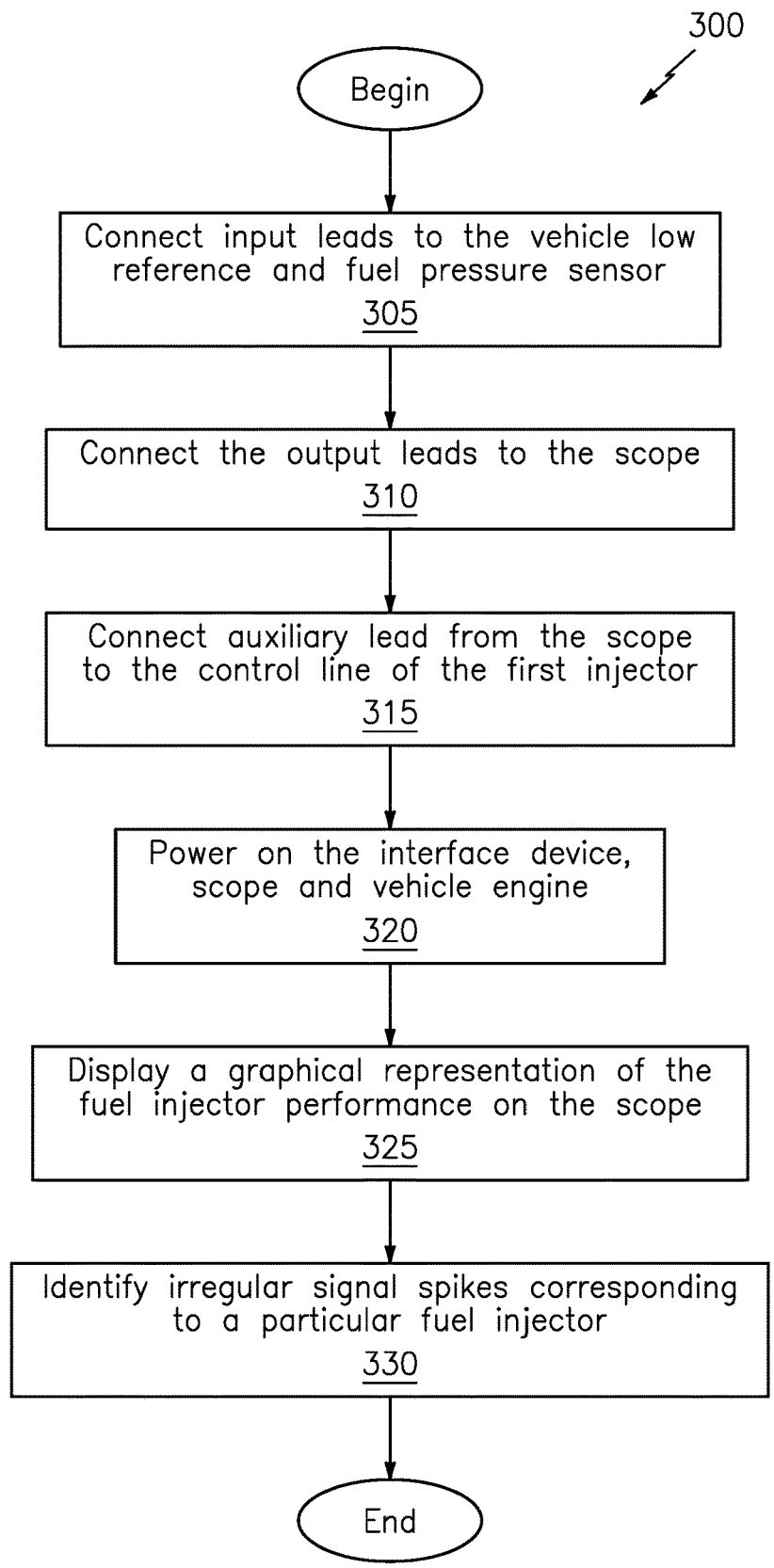
FIG. 3 is a flow diagram of a method for using the exemplary fuel injector interface device to detect an anomaly in a fuel injector, in accordance with one embodiment of the invention.

A method 300 of connecting the interface device 10 will now be described with reference to FIG. 3. As shown, the method can begin at step 305 where the input leads 12 and 13 are connected to the vehicle ground/low reference and fuel pressure sensor 4, respectively. Next, the output leads 14 and 15 can be connected to the negative and positive scope input leads on a suitable display unit 6 at step 310.

Next, the method can proceed to step 315 where an auxiliary lead 7 from the scope 6 can be connected to the control line 5 for a particular fuel injector I1-I4. In the preferred embodiment, the lead will be connected to the first injector so as to clearly identify the firing order of the injectors on the display.

Next, both the device 10 and the scope 6 can be powered on and the vehicle engine can be started at step 320, and a graphical representation of the fuel injector performances can be shown on the display 6, at step 325.

Finally, at step 330, a user can view the graph on the display 6 to determine anomalies in individual fuel injector performance.

Figure 4:
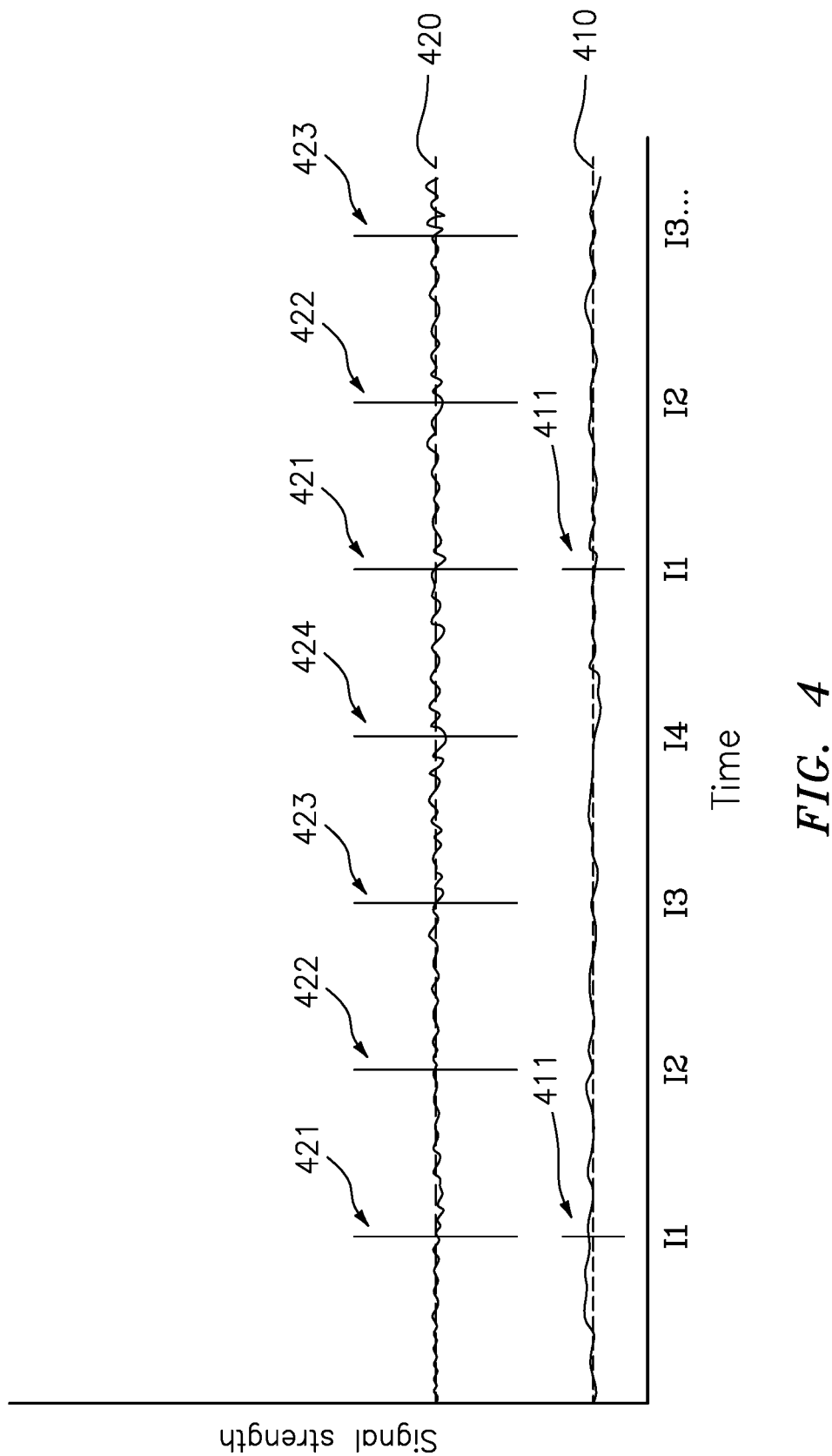
FIG. 4 is a graph depicting a normal fuel injector performance, in accordance with one embodiment of the invention.

FIG. 4 shows an exemplary waveform representation of fuel injector performance on a display 6 that is connected to the device 10 as described above. In the present embodiment, line 410 represents the signal that is received by the auxiliary lead 7 which is preferably connected to the fuel injector control line of the first cylinder's fuel injector I1. Likewise, line 420 represents the signal received by input lead 13 that is connected to the pressure sensor 4 of the vehicle.

As shown, the control line 410 shows a signal spike 411 each time the first injector I1 fires. Because line 410 spikes each time injector I1 fires, the technician can easily and visually correlate the corresponding spikes along line 420 to each of the fuel injectors. As such, line 420 has a series of evenly spaced spikes 421, 422, 423, and 424, representing the filtered rail pressure signals for each of the four individual injectors I1, I2, I3 and I4 of the four-cylinder engine.

In the present embodiment shown at FIG. 4, the spikes 421-424 of line 420 are uniform with each other during engine operation. Such a situation provides a clear visual indicator that each injector I1-I4 is firing properly and proportionally to the other injectors in the engine. As such, the graph of FIG. 4 indicates the fuel injectors of the target vehicle are operating correctly.

Figure 5:
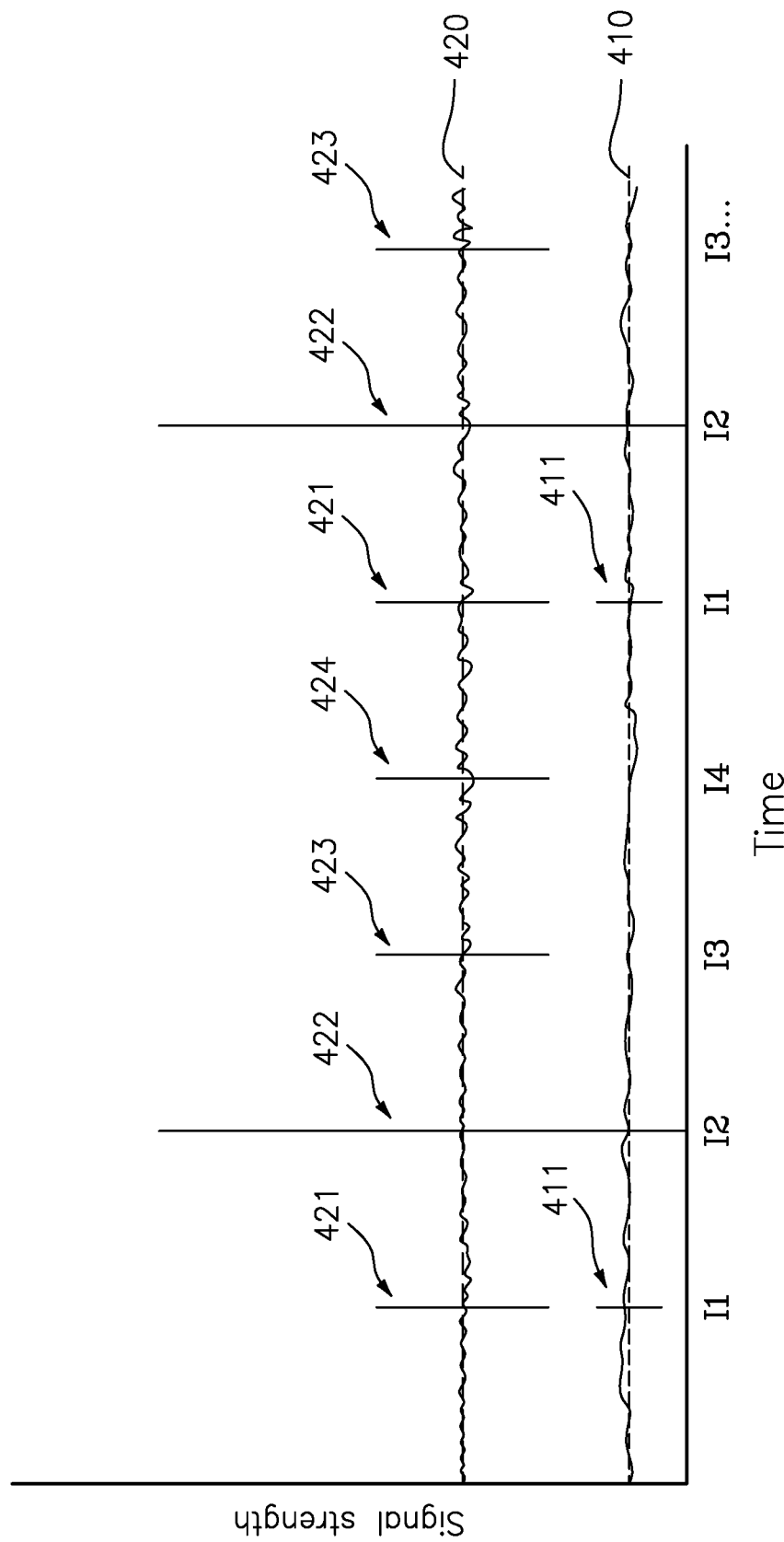
FIG. 5 is a graph depicting a faulty fuel injector, in accordance with one embodiment of the invention.

FIG. 5 illustrates another exemplary waveform representation of fuel injector performance on a display 6 that is connected to the device 10 as described above.

As shown, the spikes of line 420 in FIG. 5 are not uniform as the signal 422 representing the second injector I2 is well beyond what the other injectors are reporting. As such, the graph of FIG. 5 indicates that the second injector I2 is faulty and needs to be replaced.

Accordingly, the above described device and method allow a vehicular technician to quickly and easily identify anomalies of individual fuel injectors within a vehicle engine, in a manner that does not require each injector to be removed and replaced or bench tested.

As described herein, one or more elements of the fuel injector interface device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A fuel injection interface device, comprising:
a controller;
a pair of input leads each having a first end that is configured to engage a pressure sensor and a second end that is communicatively linked to the controller;
a pair of output leads each having a first end that is configured to engage directly with a display device and a second end that is communicatively linked to the controller; and
an auxiliary lead having a first end that is configured to engage directly with the display device and a second end that is communicatively linked to a control line of a fuel injector;
wherein the display device is configured to display a first signal received from the control line of the fuel injector through the auxiliary lead;
wherein the display device is configured to display a second signal received from one of the pair of output leads, wherein the second signal is based on a reference signal received from the pressure sensor;
wherein the display device is configured to receive a third signal from another one of the pair of output leads, wherein the third signal is based on a low reference signal received from the pressure sensor.

2. The device of claim 1, wherein the controller includes:
a power source;
a power conditioner that is communicatively linked to the power source;
an input buffer that is communicatively linked to each of the input leads;
a high pass filter that is communicatively linked to the input buffer;
a low pass filter that is communicatively linked to each of the high pass filter and the power conditioner; and
an output signal amplifier that is communicatively linked to each of the low pass filter and the pair of output leads.

3. The device of claim 2, wherein the power source includes functionality for powering the controller.

4. The device of claim 3, wherein the power source comprises a 9-volt battery.

5. The device of claim 2, wherein the power conditioner includes functionality for establishing a floating ground reference low.

6. The device of claim 2, wherein the input buffer includes functionality for sending the low reference signal to the another one of the output leads, and for sending the reference signal to the high pass filter.

7. The device of claim 6, wherein the input buffer further comprises a decoupler.

8. The device of claim 6, wherein the high pass filter includes functionality for cancelling a direct current offset from the reference signal.

9. The device of claim 8, wherein the low pass filter includes functionality for removing a high frequency noise from the reference signal.

10. The device of claim 9, wherein the signal amplifier includes functionality for amplifying the reference signal from the low pass filter.

11. The device of claim 10, wherein the low reference signal is a ground signal.

12. The device of claim 2, further comprising:
a boost converter that is communicatively linked to the power source and the power conditioner.

13. The device of claim 12, wherein the boost converter includes functionality for increasing a voltage supplied from the power source.

14. The device of claim 13, wherein the boost converter comprises:
a single DC boost conversion circuit capable of converting a 9-volt input to a 32-volt output.

15. The fuel injection interface device of claim 1, wherein the display device is a mechanic's diagnostic scope.

* * * * *